T. A. SPERRY.
BOTTLE WASHING AND STERILIZING MACHINE.
APPLICATION FILED APR. 27, 1917.
1,285,446.
Patented Nov. 19, 1918.
3 SHEETS—SHEET 1.
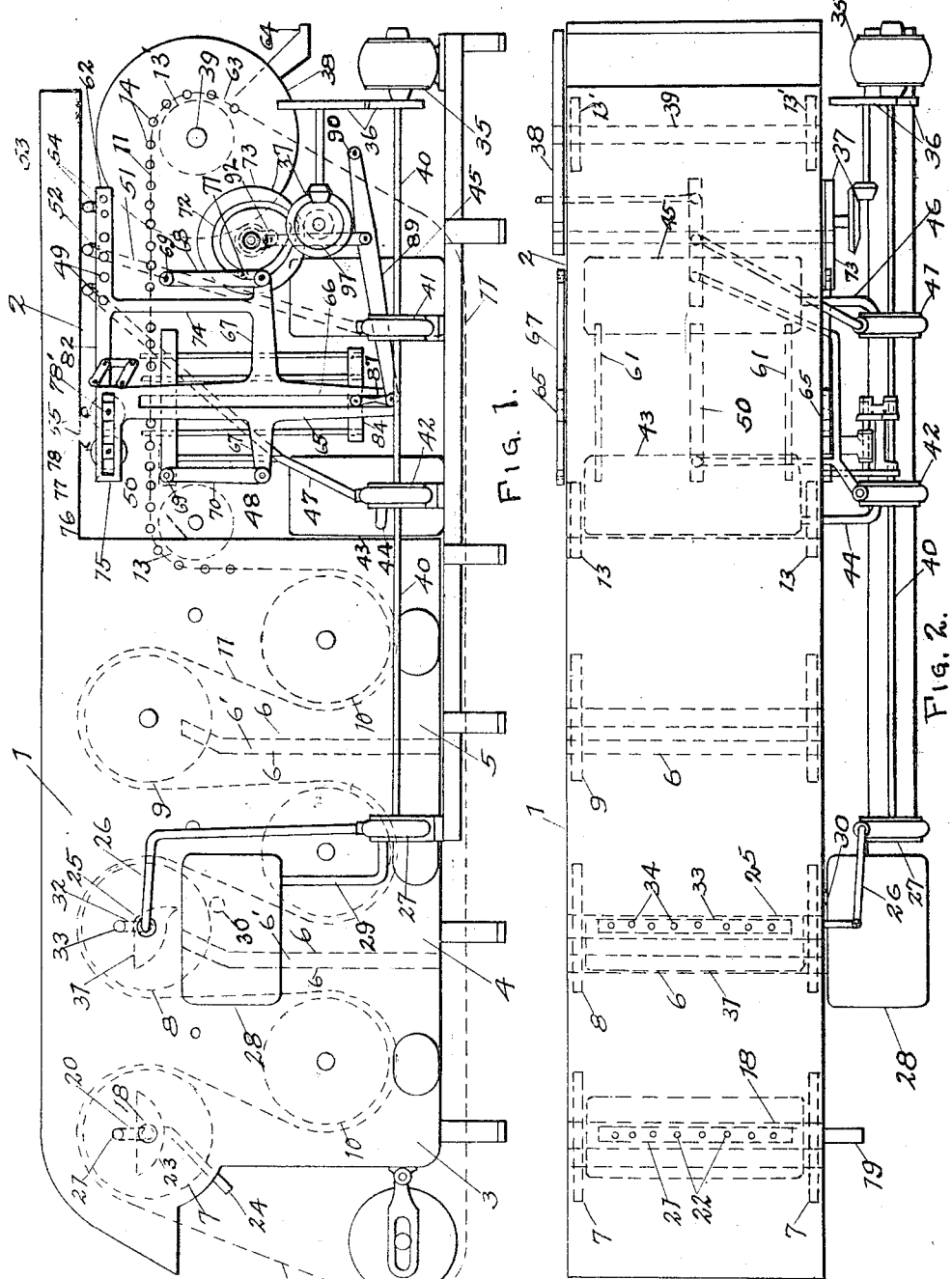

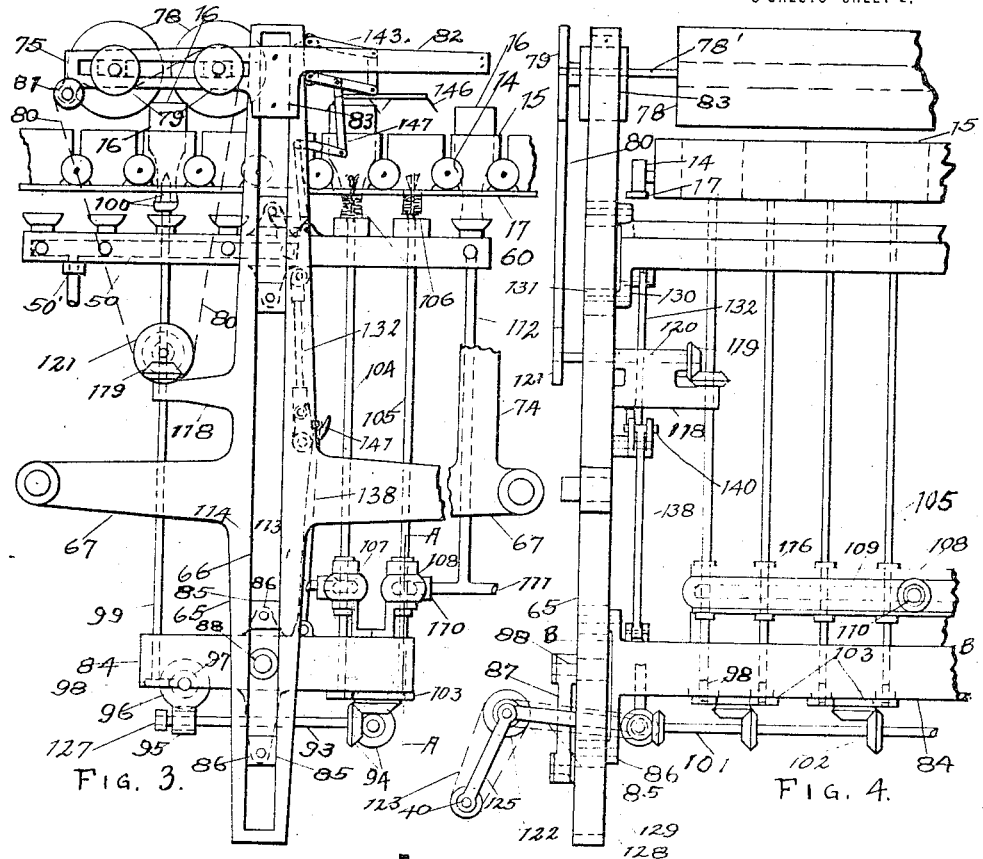
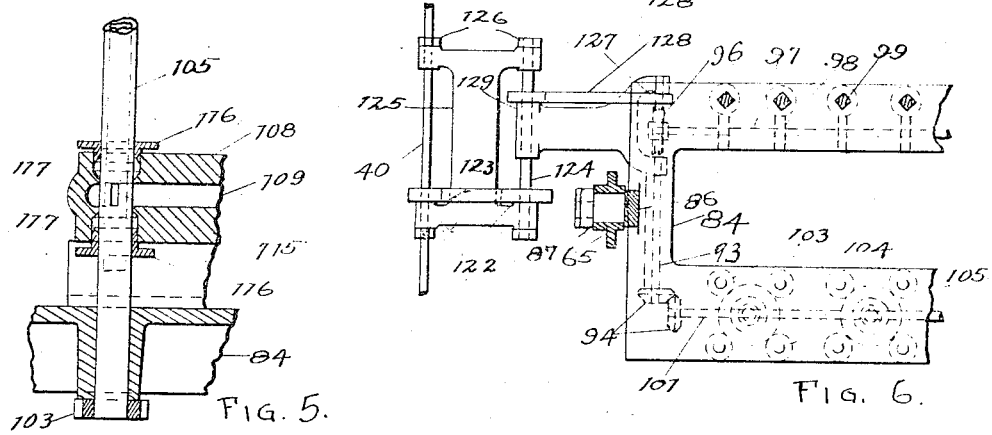

T. A. SPERRY.
BOTTLE WASHING AND STERILIZING MACHINE.
APPLICATION FILED APR. 27, 1917.
1,285,446.
Patented Nov. 19, 1918.
3 SHEETS—SHEET 3.
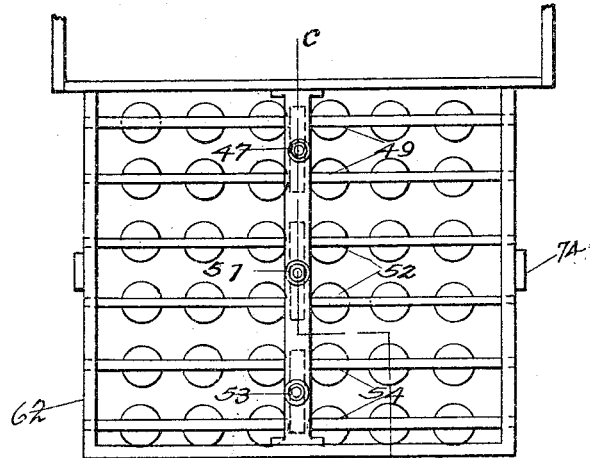
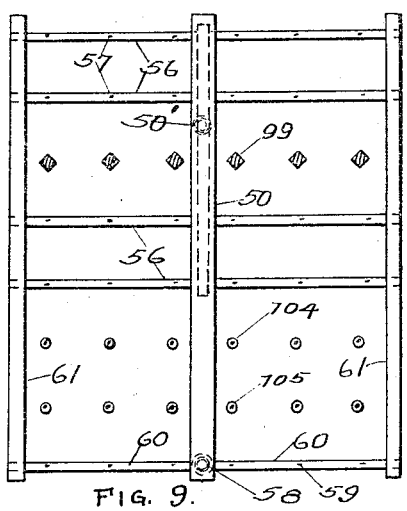
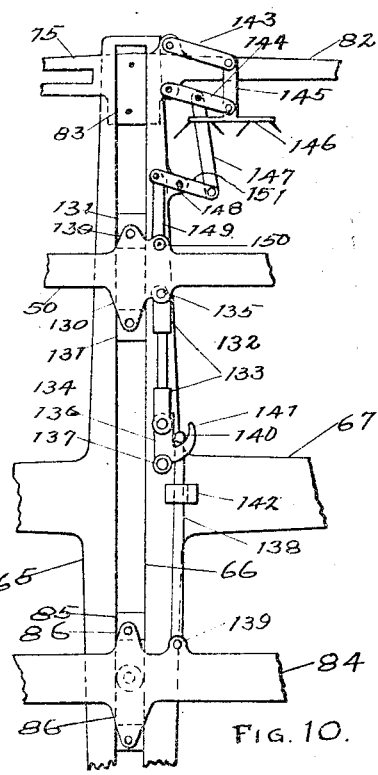
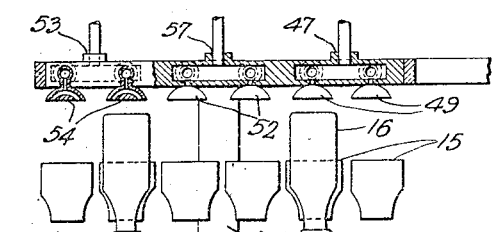
WITNESSES
Helen Hunt.
F. A. Barnes.
T. A. Sperry,
Inventor.

UNITED STATES PATENT OFFICE.

THEODORE A. SPERRY, OF INDIANAPOLIS, INDIANA, ASSIGNOR TO 20TH CENTURY MACHINERY COMPANY, OF MILWAUKEE, WISCONSIN, A CORPORATION OF WISCONSIN.

BOTTLE WASHING AND STERILIZING MACHINE.

1,285,446.  Specification of Letters Patent.  Patented Nov. 19, 1918.

Application filed April 27, 1917. Serial No. 164,864.

*To all whom it may concern:*

Be it known that I, THEODORE A. SPERRY, a citizen of the United States, and a resident of the city of Indianapolis, county of Marion, and State of Indiana, have invented certain new and useful Improvements in Bottle Washing and Sterilizing Machines, of which the following is a specification.

My invention relates to bottle washing and sterilizing machines, and more particularly to that class of bottle washing machinery which combines a bottle soaker, rinser, brusher and sterilizer, and has for its principal object the thorough washing, cleansing and sterilizing of bottles, so they may be both mechanically and bacteriologically clean and sterile, before being again used for commercial purposes.

The principal object of this invention is the bacteriological sterilization of bottles by subjecting them, after washing, to an internal brushing and jet spraying with live steam.

A more specific object is the production of a machine that will rinse the bottles as soon as placed in the machine, carry them automatically through a series of cleansing solutions or tanks, rinse off the solutions, brush the bottles outside and inside, sterilize them with live steam, cool off the bottles and deliver them automatically to any desired filling or carrying devices desired.

A further object is the production of a machine that will carry large quantities of bottles automatically through the above cycles of operation, carrying them forward by a constant, uniform motion, performing all brushing, rinsing and sterilizing and other operations on them in sequence as they advance and without manual handling other than merely placing the bottles in the machine.

A further principal object is the production of a machine that will control the temperature of the bottles so as to bring them by definite gradations from an atmospheric temperature to the full temperature of live steam, and then reduce their temperature by stepped gradations again to atmospheric temperature, and by the proper control of these gradations to reduce the breakage of bottles to a minimum.

With these objects in view, and such others as will incidentally appear as the description of the invention proceeds, my invention relates to mechanism and construction which will be best understood from consideration of the annexed drawings which compose an integral portion of these specifications, and which illustrate a preferred embodiment of the device, and in which:

Figure 1 presents a vertical side elevation of the general assembly of the machine, some of the minor portions, for sake of clarity, being omitted; Fig. 2 presents a general plan view of the device; Fig. 3 presents a fragmentary elevation of a portion of the rinsing, brushing and sterilizing arrangement, Fig. 4 being a partial front elevation of this arrangement; Fig. 5 is an enlarged sectional view of the lower end of one of the internal brushing spindles, taken on line A—A of Fig. 3, and showing method of supplying water or steam to these brushes; Fig. 6 is a plan view on line B—B of Fig. 4, showing method of revolving all spindles; Fig. 7 is a plan detail of the bottle cooling device, Fig. 8 being a sectional side elevation of the same device, taken on line C—C of Fig. 7; Fig. 9 is a detached plan view of the rinser and sterilizer header, and Fig. 10 is an inside view of the linkage between the headers and for the bottle holding cups.

Corresponding and like parts are referred to in the following description and in all views of the accompanying drawings by the same reference characters, and while I have shown and described a preferred embodiment of the device, I wish it understood that I do not limit myself to this precise construction, but claim all that legitimately falls within the scope of the spirit of the invention.

With more particular reference to the drawings, the numeral 1 indicates the soaker portion of the machine in general, and 2 likewise indicates the rinser and sterilizer mechanism in general. The soaker comprises a plurality of tanks or compartments, 3, 4 and 5, of which there may be any desired number, preferably of sheet steel construction, the adjacent compartments being separated by double walls 6—6 with air space 6' between them, to more readily control the temperature of the adjacent compartments. Mounted in the general space above the tanks are a plurality of sheave wheels 7, 8 and 9, similar sheaves 10 being located near the bottom of each of the compartments. Over and around these sheaves, and also over sheaves 13—13′ and underneath the machine and around the tightener sheave 12, travels an endless apron or bottle conveyer 11, composed of suitable links carrying small roller wheels 14 which travel on the periphery of all sheaves and on the horizontal trackway 17, the bottles 16 being carried in generally inverted position in pockets 15 of the conveyer, the conveyer being made of any suitable width commensurate with the output desired.

Sheaves 7 revolve on a hollow stationary shaft 18 which is connected as at 19 to any suitable source of water supply, the water being transmitted through vertical pipe 20 to a spray pipe or header 21 having orifices 22 to project streams of water vertically into the bottles as they pass in inverted position in pockets 15 around sheaves 7. A suitable catch basin 23 is provided beneath shaft 18 to catch and carry off, through overflow 24, all water from this spray as it leaves the bottle. Sheaves 8 similarly revolve on stationary hollow shaft 25 which receives through pipe 26 from pump 27 a supply of fluid, preferably a caustic soda solution of about 100° temperature, pump 27 getting its supply from tank 28, through pipe 29, tank 28 being constantly filled through opening 30 from compartment 4, a catch basin 31 being provided to return the solution to compartment 4 after being forced through shaft 25, vertical pipe 32, header 33 and orifices 34 into the bottles as the conveyer passes around sheaves 8.

The machine is driven by a suitable motor 35 through gears 36 and gearing 37 and 38, the gear 38 being rigidly attached to shaft 39 to which is also rigidly attached sprocket wheels 13′ the teeth of which co-act with rollers 14 to impel conveyer 11 uniformly forward. Motor 35 is also provided with elongated shaft 40 driving pumps 41, 42 and 27, pump 42 taking its supply through pipe 44 from tank 43 and delivering its output through bifurcated pipe 47 to cooling header 49 and through pipe 48 to rinser header 50, tank 43 being preferably supplied with clean water of about 180° temperature. Pump 41 draws its supply through pipe 46 from tank 45, which is preferably supplied with clean water of about 100° temperature, and delivers same through pipe 51 to cooling header 52. The cooling device is further supplied with headers 54 receiving water through pipe 53 from any desired source. The rinser header 50 is provided with spaced parallel spray tubes or pipes 56 having suitable orifices or jets 57 to aline with the bottles, this header supplying water also to spray pipes 55 by flexible pipes (not shown) for supplying water to brushes 78. Attached to rinser header 50 is also the sterilizing header 60 receiving live steam through pipe 58 and injecting it into the bottles, after brushing, through orifices 59, frame work 61 and 62 supporting the header parts in spaced relation throughout. After passing the cooling headers, the bottles are unloaded by gravity, as at 63, to any suitable conveyer or filling apparatus as generally indicated at 64.

Movably mounted on either side of the rinser portion 2 of the machine are swinging frames 65 having vertical guides 66, the frames being supported by horizontal arms 67 pivotally connected to links 68 and 70, these links being pivotally suspended from the machine by pins 69. Link 68 is provided with cam roller 71 operating in the cam groove 72 in disk 73 to produce a periodic horizontal reciprocation of frames 65. Adjustably connected to the upper ends of frames 65 are horizontal frame castings 75 having horizontal guides 76 in which are adjustably held the sliding bearings 77 for supporting shafts 78′ on which are positively mounted horizontal revolving brushes 78 for brushing the bottoms and outside of bottles. These brushes are revolved by sprockets 79, driven by chain 80, a suitable tightener sprocket 81 being provided. Castings 75 are forwardly extended as at 82 to assist in supporting the cooling header to be later described, these castings being adjustably attached to and supported by frame 65, as shown at 83, the cooling header also being supported from arm 67 of frame 65 by upright 74.

Between the frames 65 and adjacent their lower extremities is movably mounted the gear box 84, having arms or lugs 86 carrying sliding blocks 85 within the guides 66. Gear box 84 is moved vertically between frames 65 through links 87 pivotally attached thereto, as at 88, these links being controlled by lifting arms 89 pivoted to the machine at 90 and operated by links 91 pivotally connected to crank 92 fixedly mounted on same shaft as, and in timed relation to, cam disk 73.

Supported beneath gear box 84 is a short shaft 93 carrying bevel gears 94 at one extremity and worm 95 driving worm wheel 96 mounted on cross shaft 97 near its other extremity. A plurality of bottle lifting spindles 99 driven from shaft 97 through spiral gears 98 are carried by one portion of gear box 84, these spindles being provided at their upper extremities with suitable bottle lifting heads 100. Bevel gears 94 drive a horizontal shaft 101, carrying a plurality of bevel gears 102 which drive spindles 104 and 105 through suitable gearing 103, these spindles carrying suitable brushes 106 for brushing the insides of the bottles. Rigidly mounted on gear box 84 are distributing headers 107 and 108 surrounding a portion of spindles 104 and 105, header 107 being provided with a water distributing chamber 113 receiving water through pipes 114, while header 108 is provided with chamber 109 receiving live steam from pipe 111 connecting at 110, said pipe 111 also supplying steam through pipe 112 to header 60. Spindles 104 and 105 are hollow and receive water and steam respectively through chambers 113 and 109 through suitable elongated orifices 115, suitable stuffing boxes 116 and packing 117 being provided to prevent leakage of water or steam around the external portions of said spindles.

Spindles 99 are preferably rectangular in cross section, one of said spindles driving bevel gears 119 carried on a bracket 118 from frame 65, said bracket carrying shaft 120 to which is attached sprocket 121 coacting with chain 80 to drive outside brushes 78. Shaft 93 is driven from the prolonged motor shaft 40 through sprockets 122 and chain 123, said sprockets driving shaft 124 carried in swinging frame 125. Longitudinally slidable upon shaft 124 is a bracket 129 the opposite extremity of which surrounds and is controlled by shaft 93, shaft 93 being driven from shaft 124 by sprockets 127 and chain 128.

Header 50 has a limited vertical movement within the guides 66 of frames 65, being maintained in horizontal alinement through arms or brackets 130 and sliding blocks 131, said header being inter-related in its movements with gear box 84 through the conecting rods 132 adjustably secured within turnbuckle heads 133 pivoted at 134 to crank 136 which is pivotally mounted at 137 on frame 65. Crank 136 is operated from gear box 84 by link 138 pivoted at 139 and provided with a T-shaped head 140 coacting with horn 141 on crank 136, said link 138 being further guided in its operation by bracket 142. Pivotally connected to horizontal casting 75 are parallel arms 143 and 144 interconnected at their outer extremities by links 145 carrying bottle centering heads 146. Pivotally connected to arm 144 is link 147 which is reciprocated from header 50 by link 149 pivoted thereto as at 150, through horizontal rocker arm 151 medially pivoted to frame 65 at 148.

In operation the bottle conveyers are driven at a uniform speed by motor 35, the bottles being manually placed in the carriers 15 at the rear end of the soaker compartment. The bottles are then carried upwardly over the first rinsing jets 22 and then through the first compartment which preferably contains water and caustic of about 100° temperature. They then pass over the caustic jets 34 and through the second compartment which is filled with a stronger caustic solution of about 160° temperature. They then pass through the third compartment, preferably filled with water at 180° temperature, and thence over the rinsing jets 57 of the same temperature of water. The side frame 65 carrying the rinsing, sterilizing and cooling spray spindles 70 and headers oscillates horizontally in timed relation to the conveyer pockets 15. During the forward travel of said frames gear box 84 is elevated vertically by arms 89 so that the ends of spindles 99 enter the mouth of the bottles, lifting them out of the pockets 15 and upwardly between the revolving brushes 78 and on the downward motion of the gear box they lower the bottles again into their respective pockets. The bottles then receive an additional internal spray and when in alinement over spindles 104 they receive an internal brushing in hot water supplied through header 107 which is followed at the next oscillation of frames 65 by an internal brushing with live steam through spindles 105 and header 108, which is followed by a sterilizing jet of live steam through header 60. They then pass beneath headers 49 which spray them on the outside with water of 180° temperature, and then under headers 52, supplied with water of 100° temperature, and then under headers 54, supplied with cold water, delivering the bottles subsequently, thoroughly sterilized and cooled, to the fillers or conveyers 64. It will be understood that the frames 65 oscillate a horizontal distance equal to the space between two rows of conveyer pockets and the rinsing and brushing mechanism makes one complete cycle of operation in the interval of time taken by said conveyers in advancing a distance equal to the space between two adjacent rows of conveyer pockets. It will also be understood that suitable centering cups are provided to insure the bottles centering over their respective jets or spindles and that during the internal brushing operations the bottles are further secured against displacement by centering heads 146, these heads being automatically raised as the centering cups are lowered to allow the backward oscillation of frames 65 and their related mechanism. It is also understood that as many compartments as necessary may be utilized in the soaker and that by merely changing the one set of gears 36 the speed of the conveyer can be proportionately regulated without altering or affecting in any way the speed of the brushing spindles or of the fluid supplying pumps.

Having thus described my invention, what I claim as new and desire to protect by these Letters Patent, is:

1. In a bottle soaking and washing machine, in combination with a continuously moving conveyer operating through a plurality of soaker and rinsing compartments, of an oscillating link supported frame work, having a medially vertical guideway carrying a vertically movable gear box provided with a plurality of bottle lifting spindles and a plurality of internal tubular brushing spindles, means for revolving said spindles, cam actuated means for horizontally oscillating said frame work in timed relation with said conveyer, means for vertically moving said gear box and spindles in timed relation with said oscillations, pump actuated means for supplying fluid to a portion of said spindles, means for supplying live steam to a different portion of said spindles, a plurality of internal rinsing headers, a live steam header and a plurality of cooling headers supported by and oscillating with said frame work, pump actuated means for supplying fluid to said headers, means for centering the bottles during said rinsing operations and for holding them in place during said internal brushing operations, means for releasing said centering and bottle holding means with the downward travel of said gear box and means for automatically discharging said bottles after cooling.

2. In a bottle soaking, washing and sterilizing machine, in combination with a continuously moving conveyer moving through a series of soaking and rinsing compartments, of an oscillating link supported frame work having a single medial vertical guideway carrying a vertically operable spindle carrying and driving gear box, a plurality of spindles for lifting said bottles from said conveyer between horizontally revolving outside brushes, a plurality of spindles receiving heated fluid through orifices from a surrounding chambered header near their lower extremity, a plurality of spindles receiving live steam through a similar chambered header, means for revolving said spindles at a uniform speed regardless of the speed of travel of said conveyer and regardless of the vertical travel of said gear box, said means comprising a hingedly operating frame work and driving members interposed between the motor shaft and said gear box gearing, substantially as and for the purpose described.

In testimony whereof I have signed my name to this specification in the presence of two subscribing witnesses.

THEODORE A. SPERRY.

Witnesses:
HELEN HUNT,
F. A. BARNES.